(12) United States Patent
Lim

(10) Patent No.: US 7,170,981 B2
(45) Date of Patent: Jan. 30, 2007

(54) DUAL IP PHONE AND METHOD OF TELECOMMUNICATING BY USING THE SAME

(75) Inventor: Jae-Sang Lim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 550 days.

(21) Appl. No.: 10/621,468

(22) Filed: Jul. 18, 2003

(65) Prior Publication Data

US 2004/0017910 A1 Jan. 29, 2004

(30) Foreign Application Priority Data

Jul. 24, 2002 (KR) ...................... 10-2002-0043660

(51) Int. Cl.
H04M 11/00 (2006.01)

(52) U.S. Cl. .............................. 379/93.09; 379/93.05; 370/354; 455/420

(58) Field of Classification Search ............. 379/93.05, 379/93.09, 387.02; 370/352–356; 455/419–420
See application file for complete search history.

(56) References Cited

U.S. PATENT DOCUMENTS

| | | | |
|---|---|---|---|
| 6,028,848 A * | 2/2000 | Bhatia et al. ............... | 370/257 |
| 6,169,734 B1 | 1/2001 | Wilson | |
| 6,246,679 B1 * | 6/2001 | Yamamoto ................. | 370/352 |
| 6,298,372 B1 * | 10/2001 | Yoshikawa .................. | 709/200 |
| 6,377,570 B1 * | 4/2002 | Vaziri et al. ................ | 370/352 |
| 6,515,996 B1 * | 2/2003 | Tönnby et al. .............. | 370/401 |
| 6,873,689 B1 * | 3/2005 | Butler et al. ............. | 379/93.05 |
| 2001/0012285 A1 | 8/2001 | Shaharabani et al. | |
| 2001/0046237 A1 | 11/2001 | Chan et al. | |

FOREIGN PATENT DOCUMENTS

| | | | |
|---|---|---|---|
| JP | 01-209563 | | 8/1989 |
| JP | 10-155040 | | 6/1998 |
| JP | 11-136355 | * | 5/1999 |
| JP | 11-331271 | | 11/1999 |
| JP | 11-341073 | | 12/1999 |
| JP | 11-341152 | | 12/1999 |
| JP | 11-355474 | | 12/1999 |
| JP | 2000-125040 | | 4/2000 |
| JP | 2000-510626 | | 8/2000 |
| JP | 2001-223748 | | 8/2001 |
| JP | 2001-358830 | | 12/2001 |
| JP | 2002-124949 | | 4/2002 |

* cited by examiner

*Primary Examiner*—Fan Tsang
*Assistant Examiner*—Ramnandan Singh
(74) *Attorney, Agent, or Firm*—Fleshner & Kim, LLP (57) ABSTRACT

A dual phone, and method of telecommunicating by using the same, have an ISDN phone and IP phone. The dual phone recognizes one of ISDN mode, IP mode, and external connection mode from a user input, and connects or releases a voice path between an ISDN phone and the IP phone based on the recognized mode, thereby enabling calling between an external ISDN phone and an IP phone.

24 Claims, 5 Drawing Sheets

DUAL IP PHONE AND METHOD OF TELECOMMUNICATING BY USING THE SAME

BACKGROUND OF THE INVENTION

1. Field of the Invention

The present invention relates to internet telephony, and more particularly to a phone that functions both as an ISDN (Integrated Service Digital Network) phone and an IP phone.

2. Discussion of the Related Art

In order to call parties in remote areas, wired phones connected to a PSTN (Public Switched Telephone Network) have traditionally been used. More recently, VoIP (Voice Over Internet Protocol) phones connected to a network such as the Internet (e.g., So-called Internet phones) are being used.

The number of users of Internet services continue to increase and higher data-transmission-rates over the Internet are now required. As a result, applications such as Internet phones, Internet faxes, and Internet broadcastings are in greater demand. In the case of long distance and international calls especially, Internet phones have proven to have an advantage in terms of providing very cost-effective services compared with conventional wired-phones used over PSTN.

However, conventional Internet phone service has at least one drawback. This service is not capable of placing calls without using personal computers having modems. For example, conventional Internet phones are only able to place calls using a deployed network located between PCs (personal computers) having built-in modems in which computer-to-telephone connections exist or between telephones having connections to computer. The dependency of conventional Internet phone service on the use of computer modems places a limitation on where this service may be used, i.e., this service may only be used in areas where computer modems are located. This results in low scalability of network systems.

In order to overcome this drawback and to promote anytime/anywhere phone service at low cost, next-generation Internet phones should be introduced with high data rate capabilities.

Meanwhile, it is noted that ISDN (Integrated Service Digital Network) provides services of voice, non-voice and/or image, etc., through one subscriber line that connects a variety of terminals and equipment. Accordingly, a need exists, which heretofore has not been appreciated, for combining an ISDN phone and a Internet phone into one phone that will enable users to use a variety of services at low cost while at the same time maximizing efficiency of use.

SUMMARY OF THE INVENTION

An object of the present invention is to provide an apparatus and method of telecommunicating that substantially obviates one or more problems due to limitations and disadvantages of the related art.

Another object of the present invention is to provide an integrated or so-called dual IP phone, and method of telecommunicating by using the dual IP phone, which can, access and/or simultaneously connect to an ISDN and the Internet.

Another object of the present invention is to provide a dual IP phone, and method of telecommunicating by using the dual IP phone which enables communication to occur between an external ISDN phone and an IP phone.

To achieve these and other objects and advantages, the present invention, provides a dual IP phone which includes an ISDN phone circuit unit for performing communications with an ISDN, an IP phone circuit unit for performing communications with an Internet, a control unit which determines or recognizes an ISDN mode, an IP mode, or an external connection mode by analyzing inputted data, and controls a voice signal path between the ISDN phone circuit unit and the IP phone circuit unit based on the determined or recognized mode, and a circuit connecting unit which switches the voice signal path between the ISDN phone circuit unit and the IP phone circuit unit, and performs a data exchange between the ISDN phone circuit unit and the IP phone circuit unit.

The ISDN phone circuit unit includes an interface for establishing a connection with the ISDN, an HDLC (High-level Data Link Controller) for framing/deframing data from the interface, and a first microprocessor which generally controls the ISDN phone circuit unit and transports the deframed data to the IP phone circuit unit. The ISDN phone circuit unit further includes a first codec (coder/decoder) which converts frame data from the interface into a voice signal and converts an externally inputted voice signal into PCM (Pulse Code Modulation) data, and a handset/speaker phone circuit unit for inputting/outputting the voice signal to/from the first codec under the control of the first microprocessor.

The connecting unit includes a data communication circuit unit for exchanging data between the IP phone circuit unit and the ISDN phone circuit unit, a voice signal connecting unit for switching a path of the voice signal between the ISDN phone circuit unit and the IP phone circuit unit based on a control signal from the control unit, and a key input unit for transporting key input data inputted from a user to the control unit. The connecting unit further includes a hook on/off switch circuit unit, and a display unit for a visual display under the control of the control unit. The data communication circuit unit comprises a serial port or a bi-directional memory.

The IP phone circuit unit includes a second microprocessor for controlling a calling party of the recognized external connection mode to generate a dial tone, a second codec for simultaneously/independently converting voice signals inputted from the ISDN phone and external devices into PCM data, and a DSP (Digital Signal Processor) which generates and provides to the calling party the dial tone under the control of the second microprocessor, receives and format-converts data from the second codec, and provides the converted signal to the second microprocessor.

The second codec has two voice signal paths, the voice signal in the IP mode and external connection mode is inputted to different voice signal paths, respectively, and the IP phone circuit unit includes a connector for establishing a connection with the Internet, and a connector for establishing a connection with a computer.

In another aspect of the present invention, a method of telecommunicating by using a dual IP phone in which an ISDN phone and an IP phone are constructed into a single device, comprises selecting at least one of ISDN mode, IP mode, and external connection mode, if any user of an external ISDN phone requests an origination call in the external connection mode, connecting a data and voice signal path between the ISDN phone and the IP phone, confirming whether the user is an authenticated subscriber based on information regarding a called party and a password inputted from the user, and if the user is the authenticated subscriber, confirming an IP address of the called party based on the called party's information and connecting the user and a terminal of the confirmed IP address by transmitting the origination call to the terminal of the IP address.

The method of telecommunicating according to the present invention further includes providing a dial tone to an external connection requester after automatic connection is established between the ISDN phone and the IP phone, and inputting the password and a destination phone number of the called party after the dial tone.

The method of telecommunicating according to the present invention further includes simultaneously coding voice signals from the external connection requester and external device of the dual IP phone if the IP mode and the external connection mode are set, converting coded data into a standard data format for the respective called party, and selectively storing the data format to match data transmission rates between the external connection requester and the called party of the IP address.

It is to be understood that both the foregoing general description and the following detailed description of the present invention are exemplary and explanatory and are intended to provide further explanation of the invention as claimed.

DETAILED DESCRIPTION OF THE INVENTION

Figure 1:
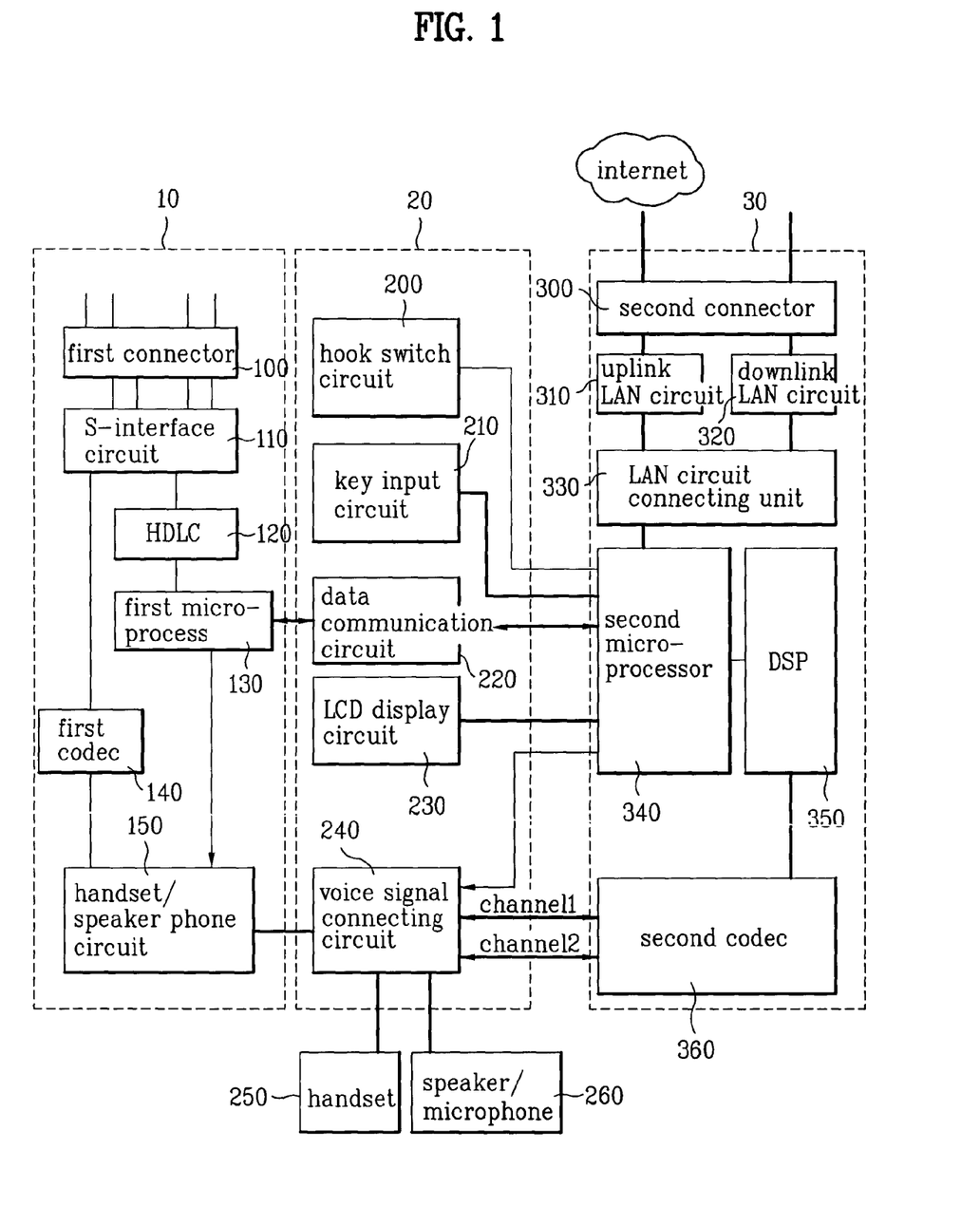
FIG. 1 illustrates a block diagram of a dual IP phone according to the present invention.

FIG. 1 illustrates a block diagram of a dual IP phone according to one embodiment of the present invention. This dual IP phone includes an ISDN phone circuit unit 10 for performing communications with an ISDN, an IP phone circuit unit 30 for performing communications with an Internet, a circuit connecting unit 20 for interworking between the ISDN phone circuit section 10 and the IP phone circuit unit 30.

The ISDN phone circuit unit 10 includes a connector 100 for establishing a physical connection between the ISDN phone and an ISDN, an S-interface 110 for establishing a connection with an S-connection point of the ISDN, an HDLC (High-level Data Link Controller) 120 for transmitting/receiving signals of ISDN-based voice and data, a first microprocessor 130 for generally controlling the operation of the ISDN phone circuit unit 10, a first codec 140 for converting an analog voice signal into PCM (Pulse Code Modulation) data and converting the PCM data into the analog voice signal, and a handset/speaker phone circuit unit 150 for enabling a user to make a call using a handset or a speaker phone. An RJ45 may be used for the connector 100.

For reference, an interface between an ISDN user and a network is called an interface between the ISDN and a private communication equipment of the user. One core constituent element of the ISDN corresponds to several multipurpose user-network interface standards which enable, for example, voice, non-voice, image, etc. Services to be received by connecting one subscriber line to a variety of terminal devices and equipment. These interfaces, also called I-interfaces, have been standardized in ITU-T and published as recommendations of I-400 groups. By dividing these function groups into several reference points, necessary physical interface standards have been prepared at the respective reference points. This is to efficiently proceed with the interface standardizing work and thus to enable manufacturers to develop corresponding equipment. Subscriber private equipment is classified into TE1, TE2, TA, NT1, NT2, etc., according to the function groups, and then divided into reference points S, T, R, etc., to prescribe interfaces at the respective reference points. For example, TE1 is connected to a network terminal NT at the reference point S, and the interface at this time is the S-interface.

The ISDN phone circuit unit 10 corresponds to TE1 in the ISDN, and the S-interface circuit unit 110 connects the ISDN phone circuit unit 10 to the network terminal NT.

The circuit connecting unit 20 includes a hook switch circuit unit 200 which is turned on/off according to use/non-use of the handset, and a key input unit 210 which converts signals input based on user manipulation of keys or buttons into signals which can be recognized by a second microprocessor 340 (to be explained later) and transports the converted signals to the microprocessor 340. Also included is a voice signal connecting unit 240 for connecting the handset/speaker phone circuit unit 150 to a handset 250 or speaker/microphone 260 or for connecting the handset 250 or speaker/microphone 260 to a first or second channel of a second codec 360 of the IP phone circuit unit 30 based on the ISDN mode, IP mode, or external connection mode. Additionally, a data communication circuit unit 220 sends/receives necessary data between the first microprocessor 130 and the second microprocessor 340 and an LCD circuit unit 230 displays an operation state of the dual IP phone.

The IP phone circuit unit 30 includes a connector 300 having a plurality of ports for establishing physical connections between the Internet and a computer, an uplink LAN circuit unit 310 for connecting to the Internet via the connector 300, and a downlink LAN circuit unit 320 for connecting to the computer via the connector 300. A LAN circuit connecting circuit 330 performs signal exchanges between the LAN circuit units 310 and 320 and establishes multiple connections. A second microprocessor 340 confirms an operation mode of the phone as corresponding to one of ISDN mode, IP mode, and external connection mode by analyzing signals inputted from the key input unit 210. The second microprocessor also controls the voice signal connecting unit 240 to be connected to the first or second channel of the second codec 360 and/or controls the handset/speaker phone circuit unit 240 to be connected to the handset or the speaker/microphone 260 based on a result of confirmation. A DSP (Digital Signal Processor) 350 provides dial signals, generated according to a control signal of the second microprocessor 340 in external connection mode, to an external calling party requesting the external connection mode via the second channel of the second codec 360, i.e., the external ISDN phone user, and converts DTMF (Dual Tone Multiple Frequency) signals from the external calling party into signals which can be recognized by the second microprocessor 340 to provide the converted signals to the second microprocessor 340. The second codec 360, which has first and second channels, converts PCM data inputted from the DSP 350 into voice data in IP mode, or simultaneously converts voice signals inputted from the voice signal connecting unit 240 through the first and second channels into PCM data to provide the converted data to the DSF 350 in external connection mode. The second codec 360 simultaneously converts the PCM data of the two channels into the voice data, or simultaneously converts the voice data of the two channels into the PCM data. The second connector 300 has a connector for establishing a connection with the Internet and a connector for establishing a connection between the computer and the dual IP phone according to the present invention.

Operation of the phone according to the present invention will now be described. The ISDN phone circuit unit 10 connects to the ISDN using the S-interface circuit 110. The HDLC (High-level Data Link Controller) 120 performs the framing/deframing of data from the S-interface. The first microprocessor 130 provides the deframed data to the second microprocessor 340 of the IP phone circuit unit 30, and controls the ISDN phone circuit unit 10. The first codec (coder/decoder) 140 converts the frame data from the S-interface circuit 110 into the voice signal, and also converts the external voice signal from the handset 250 or the speaker/microphone 260 into the PCM data. The handset/speaker phone circuit unit 150 inputs/outputs the voice signal to/from the first codec 140 by being switched over the handset or speaker phone under the control of the first microprocessor 130.

The data communication circuit 220 exchanges data between the first microprocessor 130 and the second microprocessor 340. In ISDN or external connection mode, the first microprocessor 130 provides a message for informing that a destination call is received to the second microprocessor 340 via the data communication circuit 220. Meanwhile, the second microprocessor 340 provides the operation state of the dual IP phone to the first microprocessor 130 via the data communication circuit 220. This prevents the first microprocessor 130 from optionally changing the state of the ISDN phone circuit unit 10 in this mode since the IP phone circuit unit 30 can simultaneously operate in IP mode and external connection mode. For mutual exchange of messages as described above, the data communication circuit 220 is preferably implemented using a serial port or bi-directional memory.

The voice signal connecting unit 240 switches a path of a voice signal between the ISDN phone circuit unit 10 and IP phone circuit unit 30 according to the control signal from the second microprocessor 340. Specifically, in ISDN mode, the voice signal connecting unit 240 connects the handset circuit of the handset/speaker phone circuit unit 150 to the handset 250, and also connects the speaker phone circuit to the speaker/microphone 260. Also, in IP mode, the voice signal connecting unit 240 connects the handset 250 or the speaker/microphone 260 to the second codec 360 via the first channel of the second codec 360.

In external connection mode, the voice signal connecting unit 240 connects the handset/speaker phone circuit unit to the second codec 360 via the second channel of the second codec 360. Also, in external connection mode and IP mode, the voice signal connecting unit 240 simultaneously connects the handset 250 and the speaker/microphone 260 to the handset/speaker phone circuit unit 150 and the second codec 360 via the first channel and the second channel, respectively, and makes the voice signal from outside and the voice signal of the user vocoded simultaneously.

The key input section 210 is connected in common to the IP phone circuit unit 30 and the ISDN phone circuit unit and provides a key input from the user to the second microprocessor 340. The hook switch circuit 200 is turned on/off according to the use/non-use of the handset of the handset/speaker phone circuit unit 150. Under the control of the second microprocessor, the LCD circuit unit 230 displays the operation state of the dual IP phone according to the present invention, and also displays that a destination call is received from outside to inform the reception of the call to the user. The second microprocessor 340 recognizes and sets one of ISDN mode, IP mode, and external connection mode by analyzing data inputted via the IP phone circuit unit 30, the data communication circuit unit 220, and the key input unit 210. Microprocessor 340 also applies a control signal to the voice signal connecting unit 240 based on the set mode, and provides a message regarding the corresponding mode state to the first microprocessor 130 via the data communication circuit unit 220. Microprocessor 340 also sends an origination call for performing the external connection mode and/or IP mode outside, and controls the DSP 350 to generate and provide a dial tone to the external connection mode requester. The DSP 350 generates the dial signal under the control of the second microprocessor 340, receives and format-converts the destination number and password of the corresponding called party from the requester into the data which can be recognized by the second microprocessor 340, and provides the converted signal to the second microprocessor 340.

The second codec 360 converts the PCM data from the DSP 350 into the voice signal, and converts the voice signal from the voice signal connecting unit into the PCM data to provide the PCM data to the DSP 350. The DSP 350 converts the PCM data converted from the voice signal by the second codec 360 into a standard format which can be exchanged with an external IP subscriber or computer. The DSP 350 may compress and transmit the data along with the conversion of the data into the standard format.

The second microprocessor 340 transports the data converted into the standard format to the external IP subscriber using the LAN circuit connecting unit 330 and the uplink LAN circuit. The second microprocessor 340 may store the standard format data if it is needed to do so in order to match data transmission speeds between the subscriber who has requested the external connection and the external IP subscriber.

Figure 2:
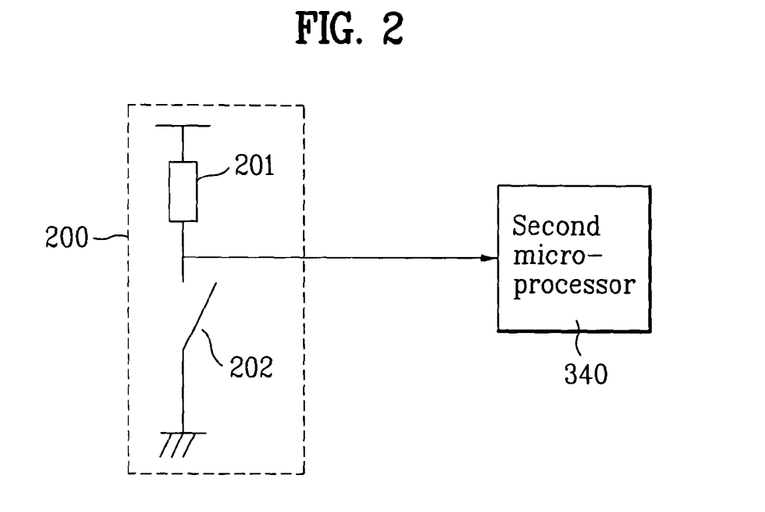
FIG. 2 illustrates a detailed circuit diagram of a hook switch circuit unit as shown in FIG. 1.

FIG. 2 illustrates a detailed circuit diagram of a preferred hook switch circuit unit 200 as shown in FIG. 1. The state of the hook switch is provided to the second microprocessor 340. The second microprocessor 340 confirms whether the user is in a calling state, and when a destination call is inputted from outside, it performs a control operation according to a result of confirming.

Figure 3:
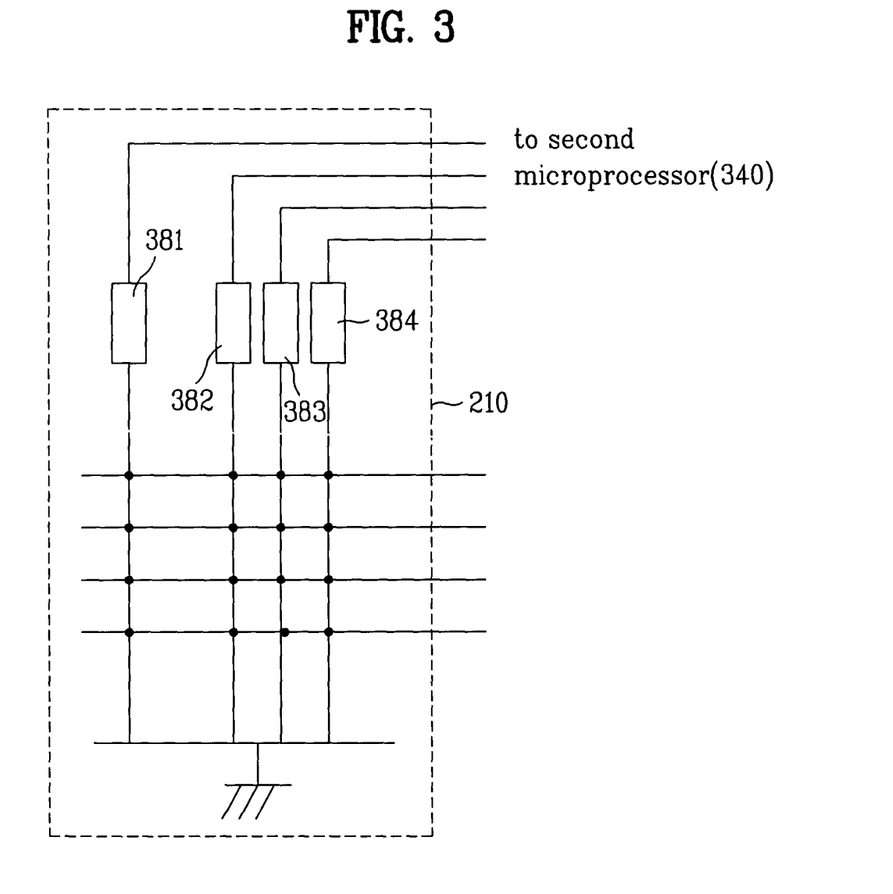
FIG. 3 illustrates a detailed circuit diagram of a key input unit as shown in FIG. 1.

FIG. 3 illustrates a detailed circuit diagram of a preferred key input unit 210 as shown in FIG. 1. The key input unit 210 senses a button inputted by a user, and converts the result of sensing into a data signal to provide the data signal to the second microprocessor 340. The second microprocessor 340 monitors the provided data signal and external data inputted through the IP phone circuit unit 30 and/or the ISDN phone circuit unit 10, and performs a necessary operation based on the corresponding mode.

Figure 4A:
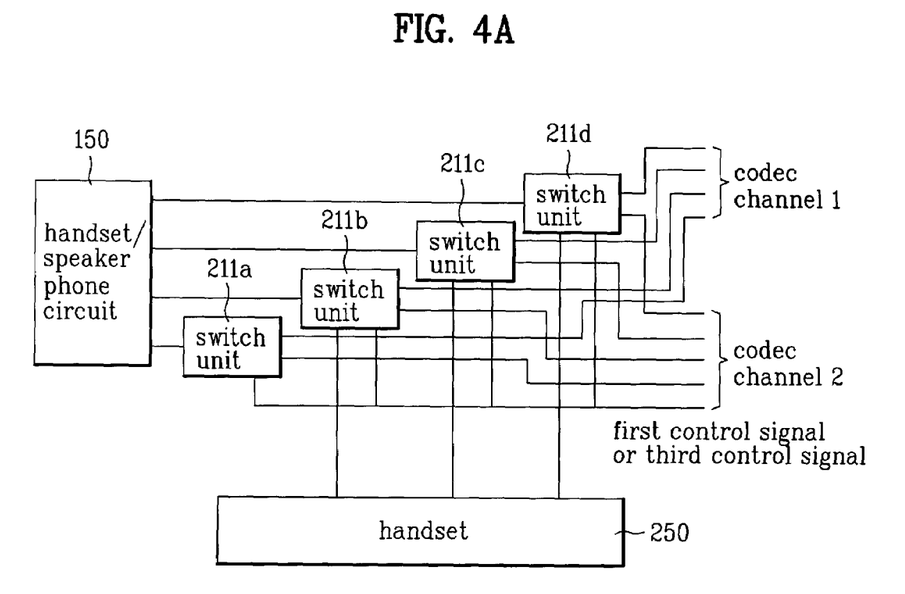
FIGS. 4A and 4B illustrate detailed circuit diagrams of a voice signal connecting unit as shown in FIG. 1.
Figure 4B:
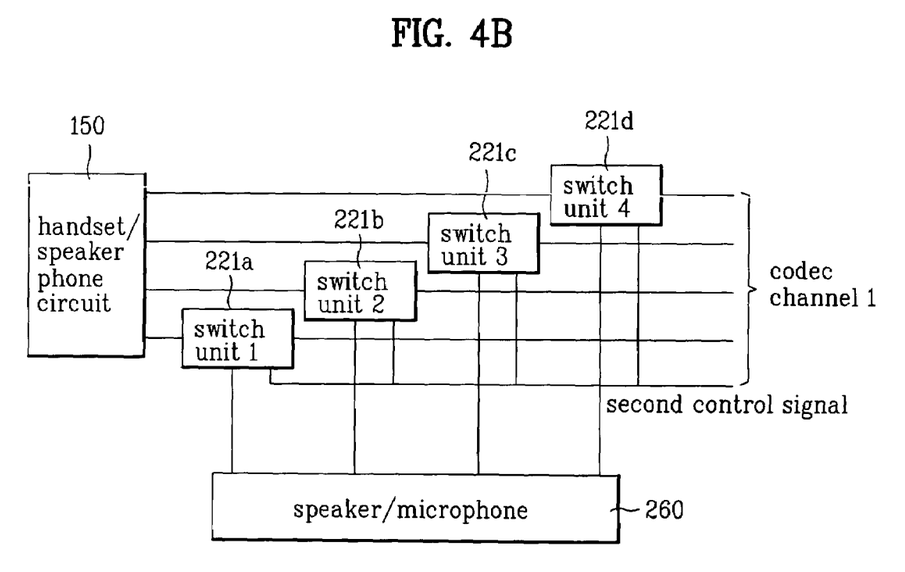

FIGS. 4A and 4B illustrate detailed circuit diagrams of a preferred voice signal connecting unit as shown in FIG. 1. Referring to FIG. 4A, when a user picks up a handset to make a call in ISDN mode, the second microprocessor 340 provides a first control signal to the voice signal connecting circuit unit 240 in order to establish a connection between the handset circuit 150 and the handset 250. In the same manner, when a user picks up a handset to make a call in IP mode, the handset 250 is connected to the second codec 360 via the first channel.

Referring to FIG. 4B, when a user pushes a speaker phone button to make a call in ISDN mode, the second microprocessor 340 provides a second control signal to the voice signal connecting circuit unit 240 in order to establish a connection between the speaker phone circuit 150 and the speaker/microphone 260. In the same manner, when a user pushes a speaker phone button to make a call in IP mode, the speaker/microphone 260 is connected to the second codec 360 via the first channel. That is, switches 211a–d of FIGS. 4A and 4B are respectively switched to corresponding devices according to the first control signal and the second control signal.

In external connection mode, the second microprocessor 340 provides a third control signal to the voice signal connecting circuit 240 in order to establish a connection with the handset/speaker phone circuit 150 and the second codec 360 via the second channel. When the switches 211a–d of FIG. 4A are switched over to the external ISDN phone according to the third control signal, the voice signal inputted from the external ISDN phone via the ISDN phone circuit unit 10 is switched by the switches to be inputted to the second codec 360, and the second codec 360 converts the voice signal into PCM data to provide the PCM data to the DSP 350.

Figure 5:
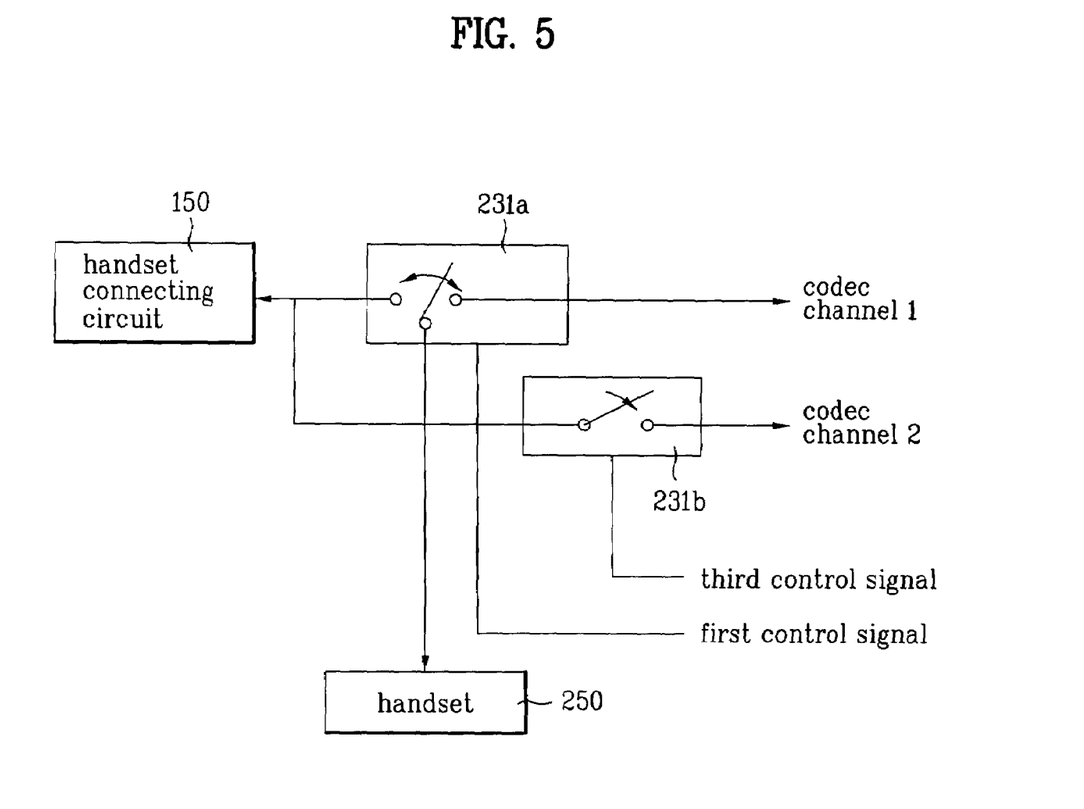
FIG. 5 illustrates a detailed circuit diagram of switches as shown in FIG. 4A.

FIG. 5 illustrates a detailed circuit diagram of the switches shown in FIG. 4A. If a user picks up a handset in ISDN or IP mode, a first switch 231a is switched by the first control signal to connect to the handset 250 which transmits/receives signals through the first channel of the second codec 360. In external connection mode, a second switch 231b is switched by the second control signal from the second microprocessor 340 to connect to the second channel of the second codec 360. The first switch 231a is automatically connected to the handset circuit 250.

Now, the method of telecommunicating using the dual IP phone according to the present invention as described above and the corresponding operation of the dual IP phone will be explained. The present invention preferably uses a menu selection or a button push in order to operate the dual IP phone in ISDN mode, IP mode, or external connection mode. For example, in order to originate a call via the ISDN phone circuit unit 10 or the IP phone circuit unit 30, an ISDN/IP selecting button (not illustrated) provided in the key input unit 210 should be toggled. Irrespective of the state of the ISDN/IP button, the phone can receive all calls. However, if destination calls are simultaneously inputted via the ISDN phone circuit unit 10 and the IP phone circuit unit 30, the user may select either of the calls or refuse all the calls which are displayed through the LCD display unit 230. That is, since the destination calls received from outside are displayed through the LCD display unit 230, the user can select or refuse the received calls after confirming them.

In the case that an external connection request call is received via the ISDN phone circuit unit 10 during the calling using the IP phone circuit unit 30 in external connection mode, the user can accept the external connection request call as he/she keeps calling.

In the case of an origination call, the ISDN phone circuit unit 10 and the IP phone circuit unit 30 according to the present invention operate in the same manner as the existing ISDN phone and IP phone. That is, if a dial tone is heard when the handset is picked up, a calling party may dial the called party's phone number. At this time, in order to operate the ISDN phone circuit unit 10, the calling party should press the ISDN/IP button, while in order to operate the IP phone circuit unit 30, the calling party should press the ISDN/IP button once again. In other words, the ISDN/IP button is toggled.

In the case of a destination call, the first microprocessor 130 of the ISDN phone circuit unit 10 and the second microprocessor 340 of the IP phone circuit unit 30 recognize the destination call. Specifically, if a destination call is input into the ISDN phone circuit unit 10 via the ISDN, the HDLC 120 recognizes the destination call, and provides the result of recognition to the first microprocessor 130. The HDLC 120 transmits the signal into dividing the signal by frames, which includes a flag for indicating a start and an end of each frame, an address code for indicating identification numbers of a calling party and a called party, a control code for indicating various kinds of control information, a data information part of a specified length, and a frame error checking code. If the second microprocessor 340 detects an error, it requests retransmission of the corresponding frame and thus a high reliability is secured.

The first microprocessor 130 recognizes the destination call and provides it to the second microprocessor 340 via the data communication circuit 210. The second microprocessor 340 grasps the present state of the dual IP phone by the provided data and the state of the IP phone circuit unit 30. If the dual IP phone is in use when the destination call is inputted, the second microprocessor 340 sends a message generated during use to the first microprocessor 130 via the data communication circuit 210. Meanwhile, if the dual IP phone is not in use when the destination call is input, the first microprocessor 130 controls a ring signal to be output to the speaker 260. That is, the first microprocessor 130 request a ring to the second microprocessor 340, and according to this ring request the second microprocessor 340 commands the DSP 350 to activate the ring. If the user picks up the handset or operates the speaker when the phone rings, the call is made.

If a destination call is input into the IP phone circuit unit 30 via the Internet, the second microprocessor 340 recognizes the existence of the destination call by analyzing data packets of the inputted destination call, and makes the phone ring through the speaker 26 according to the result of recognition. This means that the call is made in the same manner as the existing IP phone. However, in order for the ISDN phone circuit unit 10 and the IP phone circuit unit 30 to commonly use the handset 250 or the speaker/microphone 260, the second microprocessor 340 establishes a connection with the handset 250 or the speaker/microphone 260 by controlling the voice signal connecting unit 240.

Figure 6:
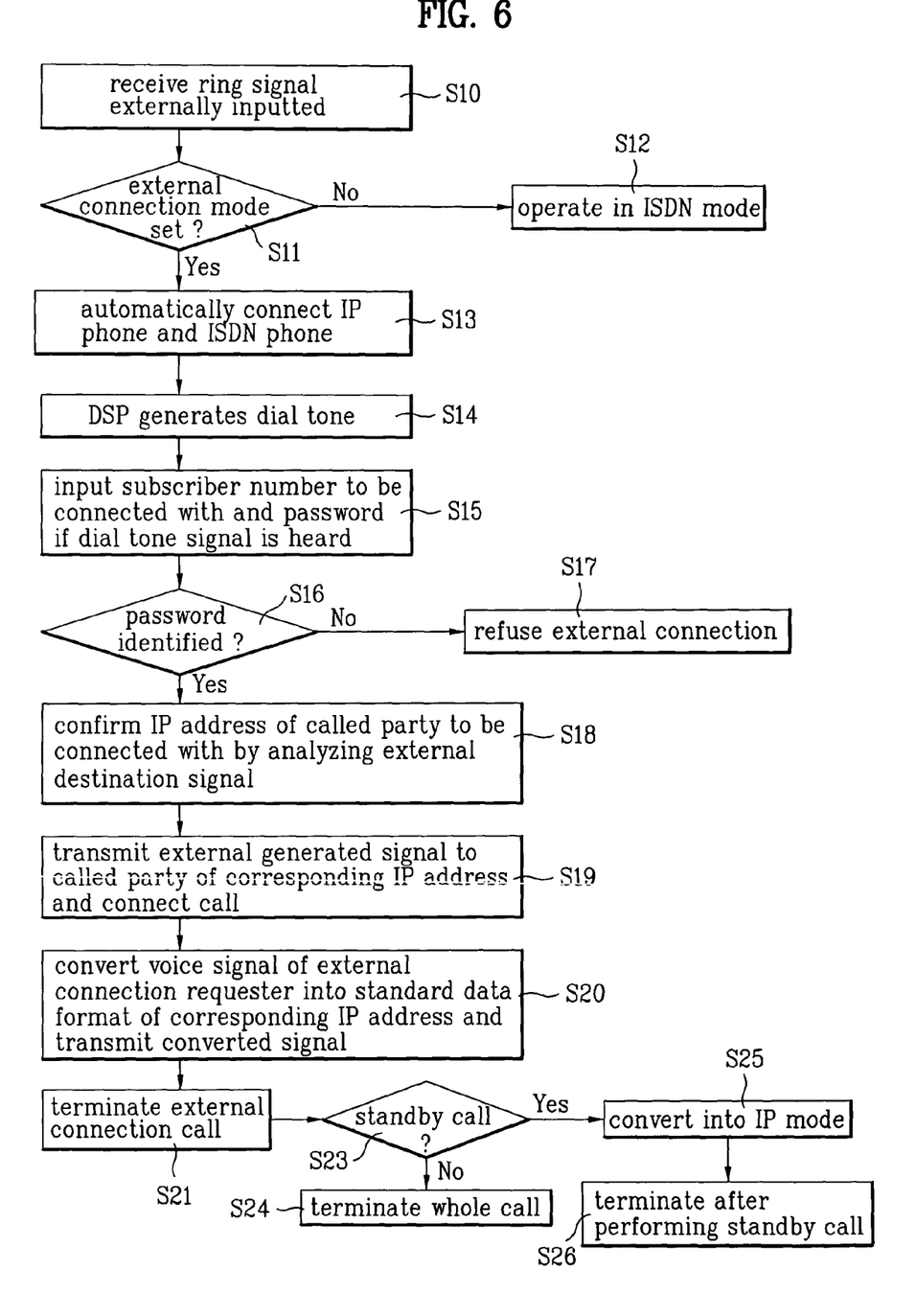
FIG. 6 illustrates a flowchart of a method of telecommunicating by using a dual IP phone according to the present invention.

FIG. 6 is a flowchart showing steps included in a method of telecommunicating using a dual IP phone according to a preferred embodiment the present invention, which especially shows the telecommunicating method in external connection mode.

If a ring signal, i.e., a destination call, is input from outside via the ISDN (step S10) and the dual IP phone is set to external connection mode (step S11), the ISDN phone circuit unit 10 and the IP phone circuit unit 30 are connected together via the data communication circuit unit 220, which is connected between the first microprocessor 130 and the second microprocessor 340. Accordingly, it is possible to make a call from the outside to the ISDN phone circuit unit 10 of the present invention via the ISDN and to make a call to the Internet via the IP phone circuit unit 30 which is connected to the ISDN phone circuit unit 10. Thus, it is possible to make a call between the existing ISDN phone and the existing IP phone via the dual IP phone according to the present invention.

More specifically, if an external calling party makes a call to the dual IP phone of the present invention using his/her own ISDN phone in external connection mode, an external destination call is input into the ISDN phone circuit unit 10 via the ISDN, and then is provided to the first microprocessor 130 through HDLC 120. If the destination call is input and the phone rings for a preset number of times, the first microprocessor 130 informs the second microprocessor 340 of the IP phone circuit unit 30 that the destination call has arrived. The second microprocessor 340 makes the handset/speaker phone circuit unit 150 of the ISDN phone circuit unit 10 connected to the second channel of the second codec 360 by controlling the switch of the voice signal connecting unit 240. Also, the second microprocessor commands DSP 350 to provide a dial tone to the ISDN phone of the external user via the second channel of the second codec 360 (step S14), and to cope with this receives the DTMF signal from the ISDN phone of the external user. That is, the calling party who made a call from the outside to the ISDN phone circuit unit 10 hears the dial tone and dials the necessary called party's number and the preset password (step S15).

The phone number and the password, which are DTMF signals, are converted into the data format that can be recognized by the second microprocessor 34, and then provided to the second microprocessor 340. The second microprocessor 340 confirms whether the calling party is an authenticated subscriber based on the provided password (step S16). If the calling party is an authenticated subscriber, it confirms the IP address corresponding to the phone number is confirmed (step S18).

The second microprocessor 340 transmits the external origination call to the Internet using the IP address. If a called party corresponding to the transmitted external origination call receives and responds to the origination call, a call is established between the two parties (step S19).

If the second microprocessor 340 converts the voice signal from the user, who made the call from the outside to the ISDN phone circuit unit 10, into the standard data format of the corresponding IP address and transmits the converted signal, a bi-directional calling between the calling party as the user of the external ISDN phone and the called party as the user of the external IP phone is performed (step S20). If a call destination packet is received from the Internet, the second microprocessor 340 of the IP phone circuit unit 10 releases the corresponding call and informs the call destination to the first microprocessor 130, so that the corresponding call established between the ISDN phone circuit unit 10 and the ISDN is released (step S21).

If it is confirmed that any standby call exists after the completion of the phone call, the present mode is changed to IP mode, the standby call is continuously performed, and then the whole call is terminated (steps S22 to S26).

As described above, according to the present invention the ISDN and the Internet are simultaneously connected and a call with another IP phone user which is requested from an external ISDN is provided in external connection mode. This results in that a variety of phone services can be provided at low cost.

It will be apparent to those skilled in the art than various modifications and variations can be made in the present invention. Thus, it is intended that the present invention covers the modifications and variations of this invention provided they come within the scope of the appended claims and their equivalents.

What is claimed is:

1. A dual phone, comprising:
    an integrated services digital network (ISDN) phone unit including a first connector to connect to an ISDN;
    an IP phone unit including a second connector to connect to the Internet or a computer, the ISDN phone unit being different than the IP phone unit; and
    a control unit which recognizes an ISDN mode, an IP mode and an external connection mode by analyzing input data and the control unit controls a voice signal path between the ISDN phone unit and the IP phone unit based on the recognized mode.

2. The dual phone of claim 1, further comprising:
    a connecting unit which switches the voice signal path between the ISDN phone unit and the IP phone unit and performs data exchange between the ISDN phone unit and the IP phone unit.

3. The dual phone of claim 2, wherein the connecting unit comprises:
    a data communication unit for exchanging data between the IP phone unit and the ISDN phone unit;
    a voice signal connecting unit for switching a path of the voice signal between the ISDN phone unit and the IP phone unit based on a control signal from the control unit; and
    a key input unit for transporting key input data input from a user to the control unit.

4. The dual phone of claim 3, wherein the data communication unit comprises a serial port.

5. The dual phone of claim 3, wherein the data communication unit comprises a hi-directional memory.

6. The dual phone of claim 3, wherein the connecting unit further comprises:
    a hook on/off switch; and
    a display unit for providing a visual display under control of the control unit.

7. The dual phone of claim 1, wherein the ISDN phone unit comprises:
    an interface for establishing a connection with the ISDN;
    a high-level data link controller (HDLC) for framing/deframing data from the interface; and
    a first microprocessor that controls the ISDN phone unit and transports the deframed data to the IP phone unit.

8. The dual phone of claim 7, wherein the ISDN phone unit further comprises:
    a first codec (coder/decoder) that converts frame data from the interface into a voice signal and converts an externally input voice signal into pulse code modulation (PCM) data; and
    a handset/speaker phone unit for inputting/outputting the voice signal to/from the first codec under the control of the first microprocessor.

9. The dual phone of claim 1, wherein the IP phone unit comprises:
    a second microprocessor that controls a calling party of the recognized external connection mode to generate a dial tone;
    a second codec for simultaneously/independently converting voice signals input from the ISDN phone unit and external devices into PCM data; and
    a digital signal processor (DSP) that generates and provides to the calling party the dial tone under control of the second microprocessor, receives and format-converts data from the second codec, and provides the converted signal to the second microprocessor.

10. The dual phone of claim 9, wherein the second codec is coupled to two voice signal paths.

11. The dual phone of claim 10, wherein the voice signal in the IP mode is input to a different voice signal path than in an external connection mode.

12. The dual phone of claim 1, wherein the IP phone unit includes a connector for establishing a connection with the Internet.

13. The dual phone of claim 12, wherein the IP phone unit includes a connector for establishing a connection with a computer.

14. The dual phone of claim 1, wherein the ISDN phone unit corresponds to TE1 in the ISDN.

15. The dual phone of claim 1, wherein the ISDN phone unit accesses the ISDN simultaneously as the IP phone unit accesses the Internet.

16. A method of telecommunicating using a dual phone in which an integrated services digital network (ISDN) phone unit and an IP phone unit are included in a single device, the ISDN phone unit including a first interface with an ISDN, the IP phone unit being separate from the ISDN phone unit and including a second interface with the Internet or a computer, the method comprising:
   selecting at least one of an ISDN mode, an IP mode, and an external connection mode;
   if a user of an external ISDN phone requests an origination call in the external connection mode, connecting a data and voice signal path between the ISDN phone unit and the IP phone unit;
   confirming whether the user is an authenticated subscriber based on information regarding a called party and a password input from the user; and
   if the user is the authenticated subscriber, confirming an IP address of the called party based on the called party information and connecting the user and a terminal of the confirmed IP address by transmitting the origination call to the terminal of the IP address.

17. The method of claim 16, further comprising:
   providing a dial tone to an external connection requester after connection is established between the ISDN phone unit and the IP phone unit; and
   inputting the password and a destination phone number of the called party after the dial tone.

18. The method of claim 16, further comprising:
   simultaneously coding voice signals from the external connection requester and an external device of the dual phone unit if the IP mode and the external connection mode are set;
   converting coded data into a standard data format for the respective called party; and
   selectively storing the data format to match data transmission rates between the external connection requester and the called party of the IP address.

19. The method of claim 16, further comprising simultaneously accessing the ISDN through the ISDN phone unit and the Internet or the computer through the IP phone unit.

20. A method for processing calls in a phone that includes an ISDN phone unit and an Internet phone unit, the ISDN phone unit including a first interface with an ISDN, the IP phone unit being separate from the ISDN phone unit and including a second interface with the Internet or a computer, the method comprising:
   receiving a signal selecting a mode of operation of the phone; and
   automatically establishing a voice path between the Internet phone unit and the ISDN phone unit in said selected mode when a user enters an external connection request with a called party.

21. A phone, comprising:
   a first phone unit which operates in an ISDN mode, the first phone unit including a first interface with an ISDN;
   a second phone unit which operates in an IP mode, the second phone unit including a second interface with the Internet or a computer; and
   a control unit which establishes a voice path between the first phone unit and the second phone unit based on a user mode selection signal, the user mode selection signal selecting one of an ISDN mode, an IP mode or an external connection of the phone.

22. The phone of claim 21, wherein the control unit activates one of the first phone and the second phone unit and de-activates the other of the first phone unit and the second phone unit in response to another user mode selection signal.

23. The phone of claim 21, wherein the first phone unit corresponds to TE1 in the ISDN.

24. The phone of claim 21, wherein the first phone unit accesses an ISDN simultaneously as the second phone unit accesses the Internet or a the computer.

* * * * *